May 23, 1950 R. E. HERR 2,508,790
LATCH FOR PRUNING SHEARS
Filed Oct. 29, 1947
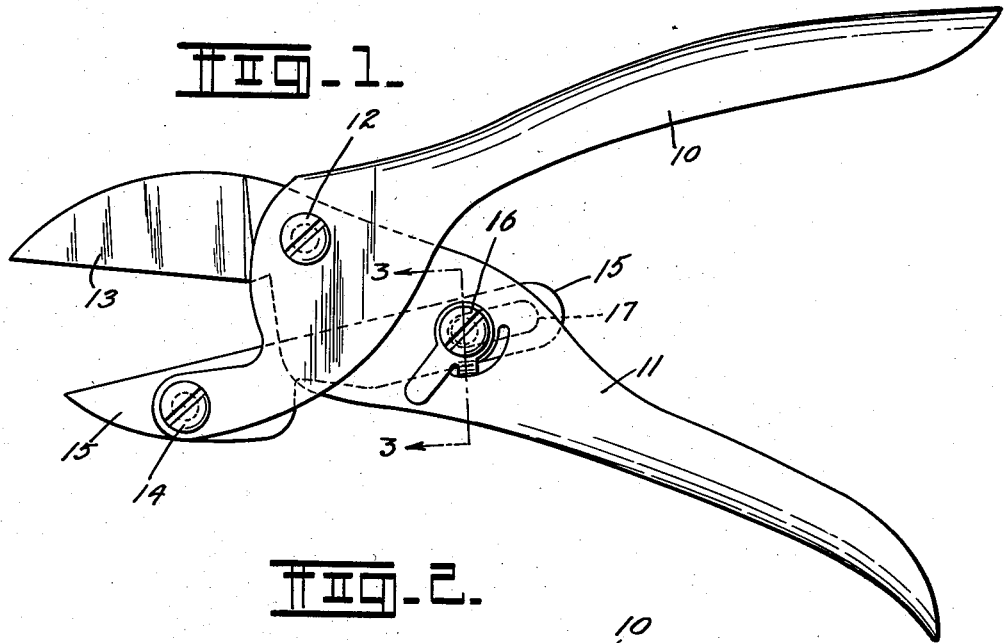
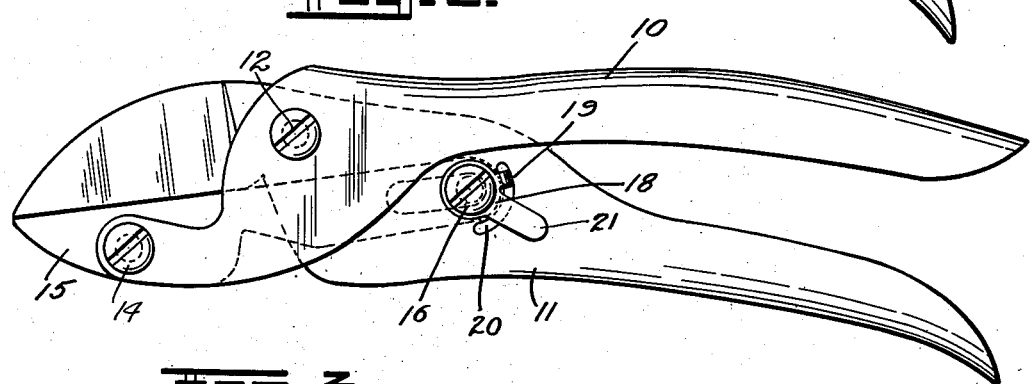
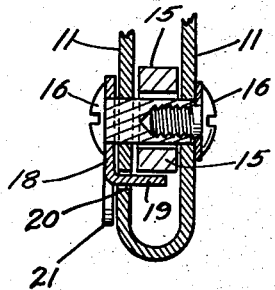
INVENTOR.
Richard E. Herr.
BY W. B. Harpman
ATTORNEY.

Patented May 23, 1950

2,508,790

UNITED STATES PATENT OFFICE 2,508,790

LATCH FOR PRUNING SHEARS

Richard E. Herr, Alliance, Ohio, assignor to The Lewis Engineering and Manufacturing Company, Alliance, Ohio, a corporation of Ohio Application October 29, 1947, Serial No. 782,841

2 Claims. (Cl. 30—181)

This invention relates generally to pruning shears and more particularly to a latch for holding the pruning shears in closed position.

The principal object of the invention is the provision of a latch for a pruning shear.

A further object of the invention is the provision of a latch cooperating in action with a reciprocal portion of a pruning shear.

A still further object of the invention is the combination of a pruning shear having a pivoted jaw member, a portion of which is reciprocally mounted with respect to a handle portion of the pruning shear and a latch member mounted on the said handle portion and engaging the said reciprocally mounted jaw portion so as to hold the same against reciprocal motion.

A still further object of the invention is the provision of a latch for a pruning shear comprising a simple manually operated latch, a portion of which engages a slidable portion of the said pruning shear so as to hold the pruning shear in closed position.

The latch disclosed herein advantageously employs the reciprocally mounted jaw portion of the pruning shear disclosed in the aforesaid patent application to achieve a satisfactory and efficient latching action. The latch is capable of being inexpensively formed and easily assembled in the pruning shear and has the additional advantage of acting in a cam-like engagement with the said reciprocating portion of the pruning shear to effect a satisfactory latching action with respect thereto.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a side elevation of a pruning shear with a reciprocal jaw portion showing the latch in unlatched position.

Figure 2 is a side view of a pruning shear having a reciprocally mounted jaw portion showing the latch in latched position.

Figure 3 is an enlarged vertical cross section taken on line 3—3 of Figure 1.

By referring to the drawings and Figures 1 and 2 in particular it will be seen that a pruning shear has been illustrated which comprises a pair of handles 10 and 11 which are bifurcated at their foremost ends and pivoted to one another by means of a pivot 12. The bifurcated foremost end of the handle 11 carries a blade 13 and the bifurcated foremost end of the handle 10 comprises a pair of spaced support members having a pivot 14 positioned transversely therebetween and supporting, in pivotal relation thereto, a foremost end of a reciprocal jaw 15. The rearmost portion of the reciprocal jaw 15 extends backwardly with respect to the pivot 14 and lies within the bifurcated handle 11 where it slidably engages a secondary pivot 16. Engagement is made with the secondary pivot 16 by reason of a slot 17 formed longitudinally in the reciprocal jaw 15.

In operation, the movement of the handles 10 and 11 to open position is accomplished by a spring (not shown) incorporated in the handle 10 and engaging a portion of the handle 11, it being observed that when the handles 10 and 11 are moved apart, the secondary pivot 16 moves away from the handle 10 and hence pivots the reciprocal jaw 15 on the pivot 14 as the reciprocal jaw 15 moves backwardly with respect to the handle 11 and the secondary pivot 16 therein.

When the pruning shear is closed, as by manual actuation as shown in Figure 2 of the drawings, the reciprocal jaw 15 moves forward with respect to the handle 11 and secondary pivot 16 so that the rearmost end portion thereof, which is rounded, moves into position adjacent the pivot 16 where it may be engaged by a latch 18 and more particularly by a depending finger 19 formed on the latch 18 and movably engaging an arcuate slot 20 formed in one of the bifurcated sections of the handle 11 in a radius based on the secondary pivot 16 and corresponding approximately with the rounded end section of the reciprocal jaw 15.

It will thus be seen that the depending finger 19 moves into engagement with the rearmost end of the reciprocal jaw 15 and thereby prevents the same from moving backwardly and thus prevents the pruning shear from being opened.

The latch 18 has a handle 21 formed thereon radially spaced with respect to the depending finger 19 and provided to permit convenient manual operation of the latch 18. The handle 21 lies on the same longitudinal plane as the handle 11 and extends sidewardly with respect thereto only in the amount of its own width and thereby forms a neat and convenient latch incapable of being accidentally actuated. The latch 21 is rotatably mounted on the secondary pivot 16 which is primarily provided for carrying the rearmost end of the reciprocating jaw 15. The latch 18 thereby comprises an inexpensive construction in that only a single part is added to the shear structure.

By referring to Figure 3 of the drawings an enlarged vertical cross section, as taken on line 3—3 of Figure 1, may be seen. It will be observed that the depending finger 19 of the latch 18 is bent at right angles with respect to the plane of the remainder of the latch 18 and particularly the handle portion 21 thereof so that it engages the slot 20 and lies beneath the reciprocal jaw 15 when the pruning shears are in open position, as shown in Figure 1, and may be moved into position immediately behind the rearmost end of the reciprocal jaw 15 when the pruning shears are in closed position, as shown in Figure 2. The secondary pivot 16, as illustrated in Figure 3, comprises a two-part screw assembly, one portion of which is hollow and receives the other portion as clearly shown in Figure 3.

Still referring to Figure 3 of the drawings it will be seen that a spring washer is positioned between the two part screw assembly comprising the secondary pivot 16 and the handle 11 of the pruning shear so that spring tension may be maintained by the two part screw assembly on the latch 18 so as to hold it against accidental movement into locked position at such time as the pruning shear is held in an upright position.

It will be seen that the depending finger 19 of the latch 18 moves against the rearmost end portion of the jaw 15 in a cam-like action at such time as the same is moved with respect thereto thereby moving the reciprocating jaw 15 into foremost position and thus effectively locking the pruning shear in closed position.

Having thus described my invention, what I claim is:

1. In a pruning shear the combination of a pair of handle members crossed and pivoted at their point of crossing and one of the said handle members having a jaw portion pivoted thereto, the said jaw portion lying partly within the other of the said handle members and slidably engaging a secondary pivot therein; and a latch member rotatably mounted on the said secondary pivot, an arcuate slot in the last mentioned handle member, a portion of the latch registering with said arcuate slot and with the innermost end of the reciprocal jaw when the pruning shears are in closed position.

2. A latch for a pruning shear having a pair of handles crossed and pivoted to one another and a jaw portion pivoted to one of the said handles and lying within the other of the said handles, the said jaw portion having a longitudinally extending slot therein and a secondary pivot in the last mentioned handle engaging the said longitudinal slot, an arcuate slot in the last mentioned handle adjacent the said secondary pivot and a latch rotatably mounted on said secondary pivot, and a portion of the said latch projecting at 90 degrees to the remainder thereof and extending through the said arcuate slot for registry with the end of the said jaw when the jaw is in foremost position and with the bottom of the said jaw when the same is in rearmost position.

RICHARD E. HERR.

REFERENCES CITED

The following references are of record in the file of this patent:

UNITED STATES PATENTS

| Number | Name | Date |
|---|---|---|
| 1,214,635 | Zimmerman | Feb. 6, 1917 |

FOREIGN PATENTS

| Number | Country | Date |
|---|---|---|
| 443,397 | Great Britain | Feb. 27, 1936 |